Oct. 3, 1961  V. A. HOOVER  3,002,598
MECHANICAL ACTUATOR WITH PROPORTIONAL TRAVEL
LIMIT CAM HAVING ADJUSTABLE CONTOUR
Filed Jan. 7, 1958  3 Sheets-Sheet 1
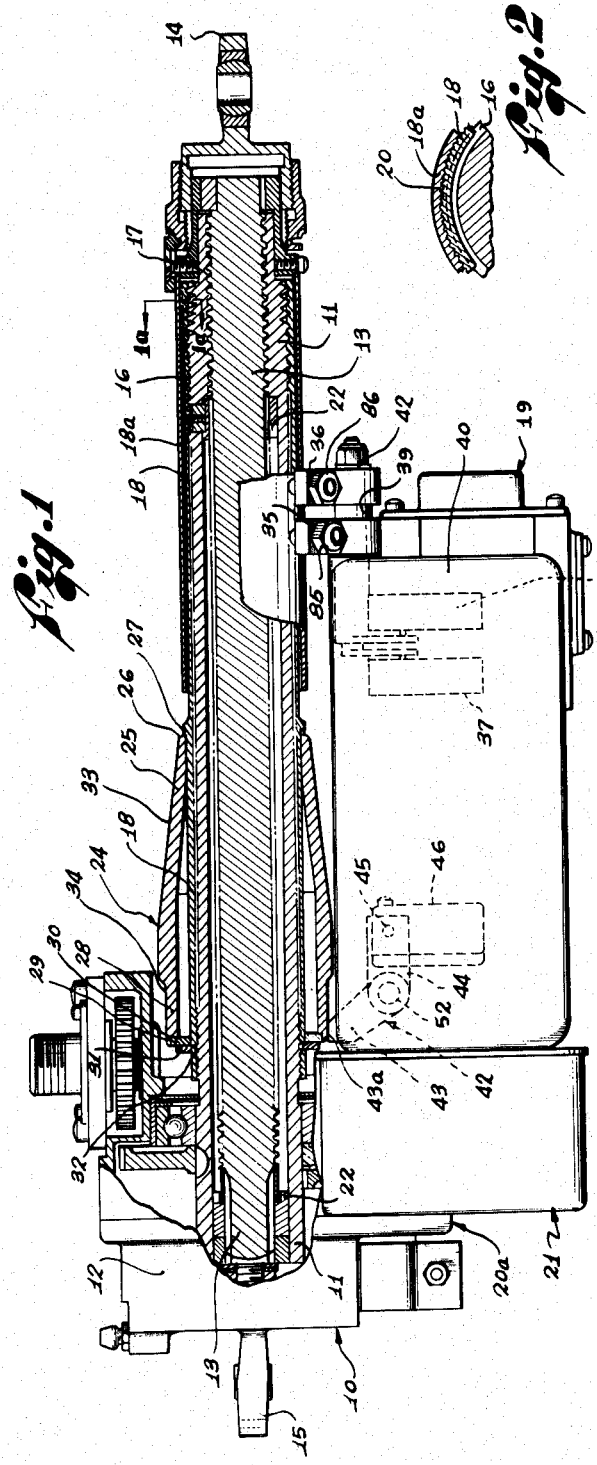
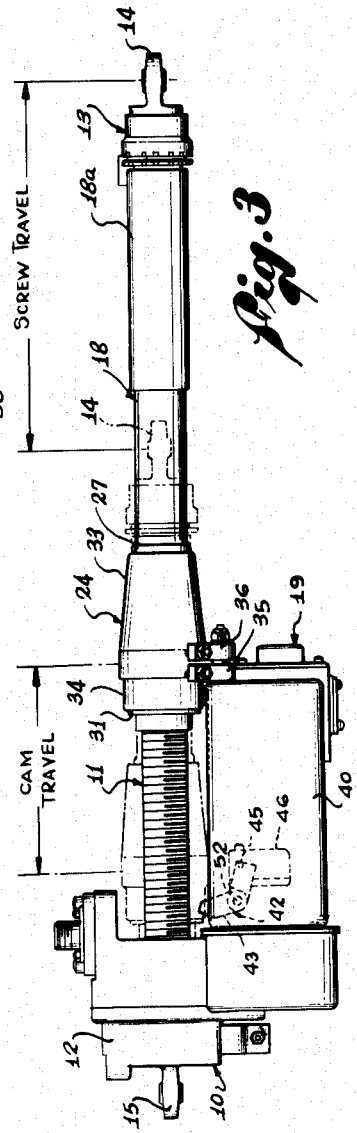
INVENTOR.
VAINO A. HOOVER
BY
Attorneys

INVENTOR.
VAINO A. HOOVER

Oct. 3, 1961 V. A. HOOVER 3,002,598
MECHANICAL ACTUATOR WITH PROPORTIONAL TRAVEL
LIMIT CAM HAVING ADJUSTABLE CONTOUR
Filed Jan. 7, 1958 3 Sheets-Sheet 3

INVENTOR.
VAINO A. HOOVER
BY
Attorneys

—

3,002,598
MECHANICAL ACTUATOR WITH PROPORTIONAL TRAVEL LIMIT CAM HAVING ADJUSTABLE CONTOUR
Vaino A. Hoover, 2100 S. Stoner Ave., Los Angeles, Calif.
Filed Jan. 7, 1958, Ser. No. 707,627
3 Claims. (Cl. 192—141)

This invention relates generally to mechanical actuators of the type which produce a linear movement, and more particularly, to a cam arrangement for controlling the positioning of long stroke mechanical actuators.

The mechanical actuators referred to in this invention are of the same general type as those disclosed in my Patent No. 2,809,736, issued October 15, 1957, and entitled, "Mechanical Actuator." These actuators have an elongated rotatable nut member which threadedly engages an elongated non-rotatable screw member and drives the screw between a retracted position and an extended position. The nut is driven by a reversible electric motor through reduction gearing. In order to stop the screw at predetermined positions along its travel, cam means are provided which extend or retract with the screw, and engage and operate switches connected in the motor circuit at certain positions of their travel. Such actuators find their principal use in aircraft where they serve as a controllable drive means for such moving parts as wing flaps and canopies.

In the usual actuators of this type, the cam means which control the positioning of the screw are carried by the screw and therefore travel the same distance. This arrangement is quite satisfactory so long as the length of travel of the screw is sufficiently short so that the switch which is engaged to stop the screw near its fully extended position is not to be positioned so far from the driving end of the actuator that the actuator is unwieldy. In certain applications, however, it is desirable to use long stroke actuators in which the screw travels a considerable distance. In these actuators, if the actuating cams are carried by the screw, the extend position switch must be positioned so far from the driving end of the actuator that an awkward design results.

It is therefore a major object of this invention to provide a cam arrangement for long stroke type mechanical actuators which overcomes the above-mentioned disadvantage.

It is also an important object of this invention to provide an actuator in which the position-controlling cam is not carried by the screw member, but instead is carried by a separate member which moves in the same direction as the screw but a proportionately smaller distance.

It is another object of this invention to provide a mechanical actuator of the type described in which an extend position, intermediate position, and retract position are all controlled by a single cam.

In this regard, it will be understood that it is quite advantageous to have all of the positions of the actuator controlled by a single cam; however, one difficulty encountered is that in the usual arrangement, once the contour of the cam has been established, the relationship between the various positions which it controls cannot be changed.

It is therefore a further object of my invention to provide a single cam for controlling extend, retract, and intermediate positions of a mechanical actuator of the type described which has means for varying the cam's contour while the actuator is in service to thereby vary the relationship between the controlled positions.

It is still another object of my invention to provide a mechanical actuator with a single cam for controlling the actuator's positioning which has a variable contour in which the variance is achieved by threadedly adjusting one point on the cam, and in which locking means are provided for fixing this variable point in the desired position.

It is still a further object of this invention to provide a mechanical actuator of the type described above which achieves the objects described and yet is simple and inexpensive to manufacture.

These and other objects and advantages of my invention will become apparent from the following detailed descripton of a preferred embodiment thereof, read together with the accompanying drawings, in which:

FIGURE 1 is an elevational view of a preferred embodiment of my actuator, partially in longitudinal section;

FIGURE 2 is an enlarged fragmentary sectional view taken on line 1a—1a in FIGURE 1;

FIGURE 3 is a reduced side elevational view, similar to FIGURE 1, showing my actuator near its fully extended position;

Figure 4:
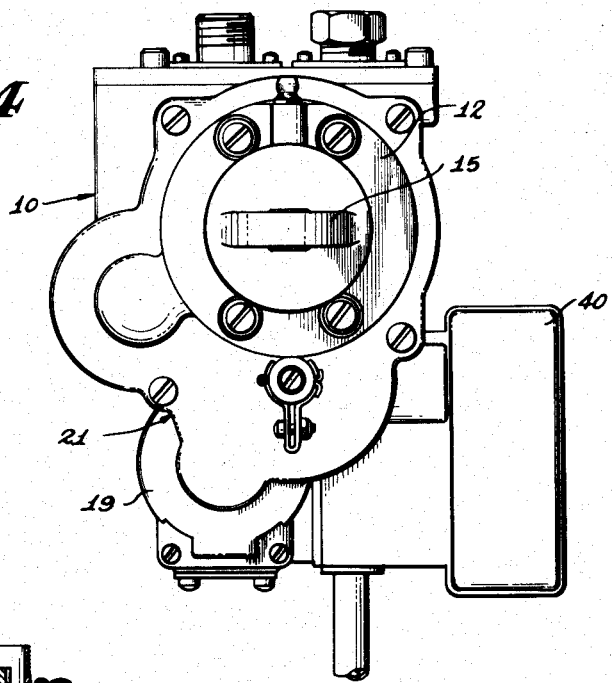
FIGURE 4 is an end view of the actuator shown in FIGURE 1 taken from the driving end thereof.
Figure 5:
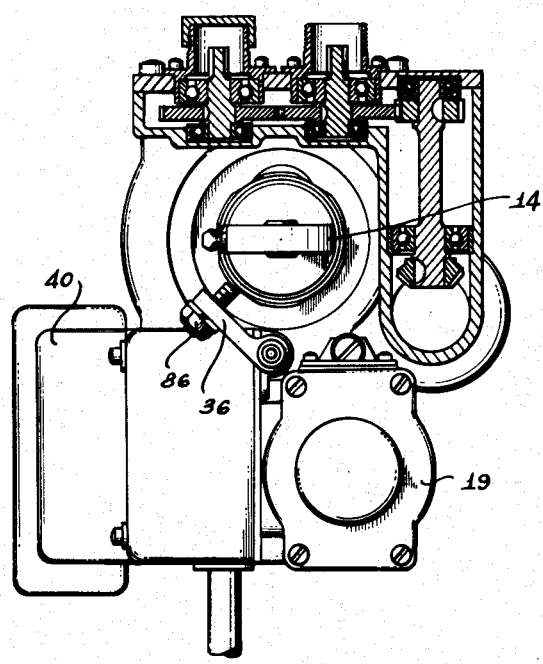
FIGURE 5 is an end view of the actuator shown in FIGURE 1 taken from the end opposite the driving end.

Referring now to the drawings, and particularly to FIGURE 1 thereof, the numeral 10 designates generally a mechanical actuator which has an elongated cylindrical nut or driving member 11 that is rotatably mounted at its inner end (left-hand end in FIGURE 1) in a housing 12. The nut member 11 extends out of the housing 12 and has a threaded bore at its outer end (right-hand end in FIGURE 1) which threadedly engages an elongated, externally threaded screw or driven member 13.

To provide means for connecting the actuator to a device driven thereby, the screw member 13 has an ear 14 attached to its outer end (right-hand in FIGURE 1) by which it is connected to a driven device. A second ear 15 is mounted on the housing 12 at the opposite end of the actuator from the ear 14. When the actuator is connected to a driven device, the screw 13 is therefore non-rotatable and upon rotation of the nut 11, is driven axially between a retracted position and an extended position, thereby causing relative movement between the ear 14 carried by the screw and the ear 15 mounted on the housing 12.

The nut 11 also has external threads 16 on the periphery of its outer end which have the same direction but a smaller lead than its bore threads 17 which engage the screw 13. A second driven member or sleeve 18 is mounted concentrically about the outwardly extending portion of the nut 11 and has a threaded bore which engages the external threads 16.

To cover the outer end of sleeve member 18 and screw member 13 and prevent the entrance of extraneous material into the threads 16 and 17, a cover tube 18a is concentrically mounted over the outer end of sleeve member 18 and attached to the outer end of screw member 13. The cover tube 18a and sleeve member 18 are engaged by means of a longitudinal spline connection 20 which prevents rotation of the sleeve when screw member 13 is non-rotatable, but allows axial movement therebetween. Therefore, when screw member 13 is non-rotatably connected to a driven device, rotation of the nut member 11 will cause both the screw member 13 and the sleeve member 18 to travel axially with respect to the nut. However, because of the difference in threads, the distance traveled by sleeve 18 will be less than, but proportional to, the distance traveled by screw 13.

In order to rotate the nut 11, a reversible electric motor 19 is provided which is connected to the nut 11 by reduction gearing 20a. Included as part of the reduction gearing 20 is a load limit mechanism 21. This mechanism is the same general type as described in my Patent No. 2,809,736, issued October 15, 1957, and entitled "Mechanical Actuator," and, in general, comprises two drivingly engaged helical gears, one of which is axially movable against spring pressure when torque greater than a predetermined amount is transmitted. Means are provided by which this axial movement operates switches in the circuit of motor 19, thus de-energizing the motor when the actuator is subjected to an excessive torque.

The actuator 10 is also equipped with anti-jam mechanical stops 22 at the limits of its extend and retract positions. These mechanical stops are the same as described in my Patent No. 2,590,251, issued March 25, 1952, and entitled "Mechanical Actuator," and, in general, consist of protruding jaws provided on both the nut and the screw which engage rotatably rather than axially, and therefore do not wedge together and jam.

To provide means for controlling the positioning of the actuator, a cam 24 is mounted on the inner end of sleeve 18 (left-hand end in FIGURE 1). The cam 24 has a bore greater than the diameter of the sleeve 18, except at its outer end 25. At the outer end 25, the cam's bore is substantially the same as the outer diameter of the sleeve 18 and forms a snug fit therewith at point 26. A shoulder 27 is formed on the periphery of the sleeve in abutting relationship with the radial face of the cam's outermost end to prevent axial movement of the cam on the sleeve in an outward direction. At its inner end 28, the cam 24 is supported by a supporting ring 29 which fits snugly on the sleeve 18 and engages a counterbore 30 in the bore of the cam 24 with its periphery. A snap ring 31 is provided which fits into a groove 32 in sleeve 18 to clamp the ring 29 in place and prevent inward axial movement of the cam 24.

The cam 24 is therefore fixed on the sleeve 18 and travels therewith. The periphery of the cam 24 has a tapered cam surface 33 at the outer end 25 and a cylindrical surface 34 at the inner end 28. As cam 24 is moved outwardly with sleeve 18, the surface 33 is brought into engagement with an intermediate actuating lever 35 and an extend actuating lever 36.

The intermediate and extend actuating levers 35 and 36 are mounted adjacent the screw member 13 at a position slightly outward of the center of the screw when in its retracted position.

To permit pivotal movement when engaged by the cam surface 33, the intermediate actuating lever 35 is affixed to a tubular shaft 39 which is rotatably supported in a switch housing 40 mounted on the casing of motor 19, and the extend actuating lever 36 is affixed to a shaft 42 which extends concentrically through the shaft 39 and is rotatable therewith.

An intermediate switch 37 and an extend switch 38 are mounted inside the housing 40 and are actuated upon pivotal movement of the actuating levers 35 and 36. Therefore, as the cam 24 is carried outwardly by the sleeve 18, the surface 33 operates the intermediate switch 37 and the extend switch 38 through the actuating levers 35 and 36 at predetermined positions along its travel. The switches 37 and 38 are connected in the circuit which energizes the motor 19 in a direction which causes the screw 13 to extend, and, when actuated, open to de-energize the motor.

The switches 37 and 38 and actuating levers 35 and 36 are so arranged and coordinated with the circuitry of motor 19 that when surface 33 of cam 24 is moved outward, it first actuates intermediate actuating lever 35 which operates intermediate switch 37 and, if the motor was energized through its intermediate position circuit, stops screw member 13 in its intermediate position. If motor 19 is then energized through its extend position circuit, the surface 33 of cam 24 will be moved further outward until it actuates the extend actuating lever 36 which will operate extend switch 38 and stop the screw member 13 in its extend position. If motor 19 is operated first through its extend position circuit, intermediate switch 37 is by-passed and the screw member 13 will move to its extend position without stopping at its intermediate position.

Since the movement of the cam 24 is proportional to the movement of screw 13, this arrangement provides an accurate method for positioning the actuator and yet permits the extend position actuating lever 36 to be mounted sufficiently close to the housing 12 and the motor housing 41 to make a compact unit.

When the nut 11 is driven rotatably so as to retract the screw 13, cam 24 will be carried by sleeve 18 inwardly toward the housing 12. When the screw member 13 approaches its retract position, the surface 34 of cam 24 will be brought into engagement with a retract actuating lever 42.

Figure 6:
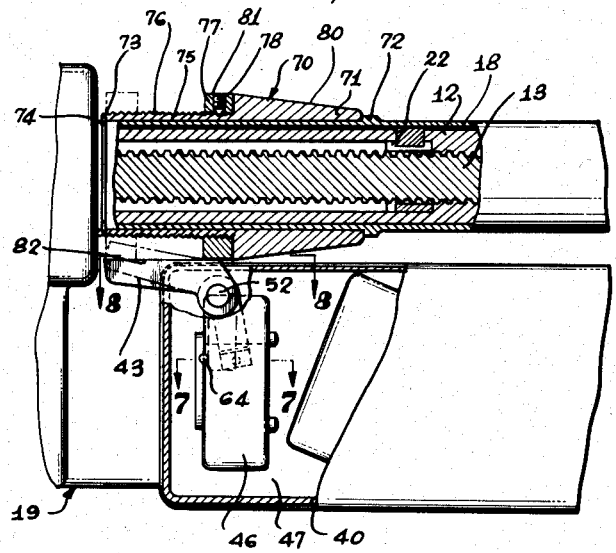
FIGURE 6 is a sectional elevational view of a portion of my actuator showing a different form of my invention.
Figure 7:
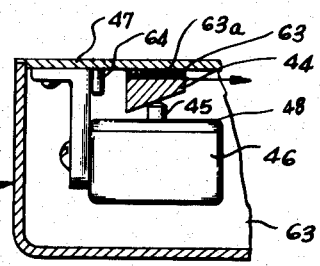
FIGURE 7 is a fragmentary sectional view taken on line 7—7 in FIGURE 6.
Figure 8:
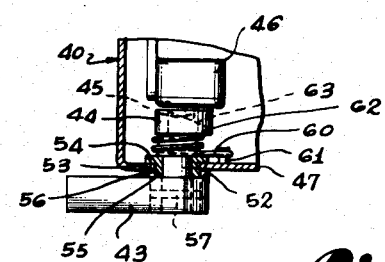
FIGURE 8 is a fragmentary sectional view taken on line 8—8 in FIGURE 6.

As best seen in FIGURES 6 and 7, the retract actuating lever 42 is mounted in the inner end of switch housing 40 and has an outer arm 43 and an inner arm 44 which are connected by a shaft 52. The shaft 52 passes through base plate 47 of switch housing 40 and is pivotally contained therein by a bushing 53. The bushing 53 has a flange 54 on its inner end which engages the inner surface of plate 47 and a neck portion 55 which protrudes beyond the outer surfaces of the plate.

A washer 56 is mounted on the outwardly protruding neck portion 55 and is held thereon by the outer arm 43. The outer arm 43 abuts washer 56 and the outer end of neck portion 55 and is fixedly held on the outer end of shaft 52 by means of a pin 57. The inner arm 44 is pinned to the inner end of shaft 52 by pin 58 in spaced relationship with the flange 54 on bushing 53.

A coil spring 60 is mounted on shaft 52 between the inner arm 44 and flange 54 with its ends extending radially outward. One end of the spring 60 is connected to the switch housing 40 by means of a protrusion 61, and at its other end it engages the inner arm 44, as at 62. The coil spring 60 is stressed both in axial compression, whereby it forces the shaft 52 inward and outer arm 43 against the washer 56 and neck 55, and torsionally, so that it forces the outer arm 43 toward the longitudinal axis of screw member 13.

The outer arm 43 has a foot portion 43a which, when engaged by the surface 34 of cam 24 pivots the actuating lever 42 against the torsion of spring 60 and moves the inner arm 44 toward engagement with a retract position switch 46. The retract position switch 46 is mounted in the switch housing 40 adjacent the retract actuating lever 42 and spaced from the housing's base plate 47. The face 48 of retract switch 46 is disposed facing the plate 47 and contains a protruding switch actuating button 45. The retract position switch 46 is connected in the circuitry of motor 19 so that, when operated, it de-energizes the motor in the direction which causes screw member 13 to move towards its retract position.

To operate retract position switch 46, the inner arm 44 has a cam surface 63 with a tapered leading edge which, when passed between plate 47 and the face 48 of switch 46, engages and forces actuating button 45 upward. The inner arm 44 also has a support surface 63a which slides on plate 47 when the retract actuating lever 42 is pivoted and thereby prevents the inner arm from being forced away from switch face 48 when cam surface 63 engages the actuating button 45. A stop 64 is also provided inside the housing 40 which engages the inner arm 44 to prevent the actuating lever 42 from pivoting outer arm 43 into contact with screw member 13 when the outer arm is not engaged with cam surface 34.

In certain applications, it is desirable to have the screw member 13 retract until it engages its mechanical stops in order to assure accurate retract positioning. When my actuator is used in such applications, the retract switch 46 is connected in the circuitry of motor 19 as a shorting switch to the switches of the load limiting mechanism 21. With this arrangement, the load limiting mechanism will not operate except when retract switch 53 is opened. Therefore, excessive torque applied to the actuator during the major portion of the travel of screw member 13 will stop the actuator, but when the screw member 13 approaches its retract limits close enough for surface 34 of cam 24 to engage the actuating lever 42 and open the retract switch 46, the load limiting mechanism 21 then takes control. When screw member 13 retracts to the point where it engages its retract mechanical stops 22, the load limiting mechanism 21 senses an excessive torque and de-energizes motor 19.

It will therefore be understood that by means of a single cam 24, I am able to control the positioning of the actuator 10 in its extend, intermediate, or retract positions. Furthermore, it will be appreciated that by means of sleeve 18 which is driven from nut 11 by threads of a different lead than is the screw 13, I have provided a positioning mechanism in which the cam does not travel as great a distance as the screw travels, but instead travels a lesser proportional distance. This permits a more compact construction of long stroke actuators, as previously explained.

In FIGURE 6 I have shown another form of my invention in which a cam 70 which has a variable contour is mounted on sleeve member 18 in place of cam 24. The cam 70 has a bore approximately the same size as the periphery of sleeve member 18 so that a tight fit is formed therebetween. The outer end 71 of cam 70 engages a shoulder 72 formed on the sleeve's periphery and a snap ring 73 is provided which fits into a groove 74 adjacent the inner end 75 of the cam 70 and holds the cam against shoulder 72.

The periphery of the cam 70 has external threads 76 at its inner end 75. An annular ring 77 is threadedly mounted on the threads 76 and is axially adjustable thereon. To hold the ring 77 in an adjusted position, a locking screw 78 is provided in the ring and disposed radially therethrough so that when tightened it engages the threads 76. To engage and actuate the extend and intermediate actuating levers 35 and 36, the cam 70 has an outer cam surface 80 which is tapered narrowingly outward. The cam surface 80 is similar to the surface 33 on cam 24 and actuates extend and intermediate actuating levers 35 and 36 in the same general manner.

The retract actuating lever 42 is engaged and actuated by inner cam surface 81 which is formed on the periphery of ring 77. Since ring 77 is threadedly adjustable on the threads 76, inner cam surface 81 is adjustable with respect to the outer cam surface 80 and the contour of cam 70 can therefore be changed. For instance, if ring 77 is adjusted to its innermost position on the threads 76, the cam surface 81 will engage and actuate the retract actuating lever 42 and operate retract position switch 46 at an earlier point in the travel of screw member 13 towards its retract position, than if the ring is adjusted to its outer most position. This changeable contour can be used to regulate the length of travel of screw member 13, or, if desired, the point at which the load limiting mechanism 21 takes control.

The retract actuating lever 42 in this form of my invention has a foot portion 82 on its outer arm 43 which is disposed parallel to the periphery of the ring 77 and extends over a sufficient axial distance to assure its engagement by the ring when the actuator approaches its retract position, whether the ring is positioned at its outermost point on the threads 76 or at its innermost point. Also, when the ring is positioned at its innermost point and the actuator is carried into its retract mechanical stops, the foot portion 82 will still be engaged with the ring 77 and will not fall behind the ring and prevent return movement of the screw member 13 in an extend direction, when desired.

From the above description, it will be appreciated that the ring 77 can be threadedly adjusted on the threaded portion 76 to vary the retract position of the actuator with respect to the intermediate and extend positions. The intermediate and extend positions may also be varied relative to each other and to the retract position by adjustment of the engaging pins 85 and 86 mounted on the ends of the actuating levers 35 and 36.

While the embodiments which I have described are fully capable of attaining the objects and providing the advantages herein disclosed, it should be understood that I do not mean to limit myself to the particular details disclosed, except as specified in the appended claims.

I claim:

1. A mechanical actuator comprising: an elongated cylindrical nut member having internal and external threads; means to effect rotation of said nut member and to prevent longitudinal movement thereof; an elongated non-rotatably mounted cylindrical screw member extending through said nut member and threadedly engaged therewith, said screw member being longitudinally movable by said nut member between an extended position and a retracted position; a sleeve carried by said screw member which has an inner diameter greater than the outer diameter of said nut member; a tubular element threadedly engaging the external threads of said nut member, said tubular element being adapted for longitudinal movement upon rotation of said nut member, said tubular element having an outer diameter slightly less than the inner diameter of said sleeve member and being slidably but non-rotatably connected thereto, said tubular element being of a length to permit it to move longitudinally within said sleeve member, cam means including two actuating portions mounted at axially spaced locations on said tubular element for travel therewith; and means including a first element actuated by the axially inner one of said portions and a second element actuated by the axially outer one of said portions to limit the movement of said end member in either direction and hence limit the distance between the retracted and extended positions of said screw member, said axially inner portion being movable to a plurality of positions along said tubular element to variably control said retracted position of said screw member, said axially outer portion being fixed relative to said tubular element, said sleeve having an axially inwardly facing shoulder positioned near said axially outer portion when said screw member is fully retracted.

2. A mechanical actuator as recited in claim 1 wherein said second element is movable to a plurality of positions along said tubular element to variably control said extended position of said screw member.

3. A mechanical actuator as recited in claim 1 wherein said axially inner and outer portions of said cam means are annular and surround said tubular element, said outer portion is outwardly tapered and said inner portion is threadedly mounted for movement toward and away from said outer portion and includes screw means to lock said inner portion in any of said plurality of positions.

References Cited in the file of this patent

UNITED STATES PATENTS

| 2,422,495 | Morrow | June 17, 1947 |
| 2,482,464 | Chapman | Sept. 20, 1949 |
| 2,679,559 | Morris et al. | May 25, 1954 |
| 2,809,736 | Hoover | Oct. 15, 1957 |

FOREIGN PATENTS

| 948,534 | France | Jan. 31, 1949 |